Figure 1:
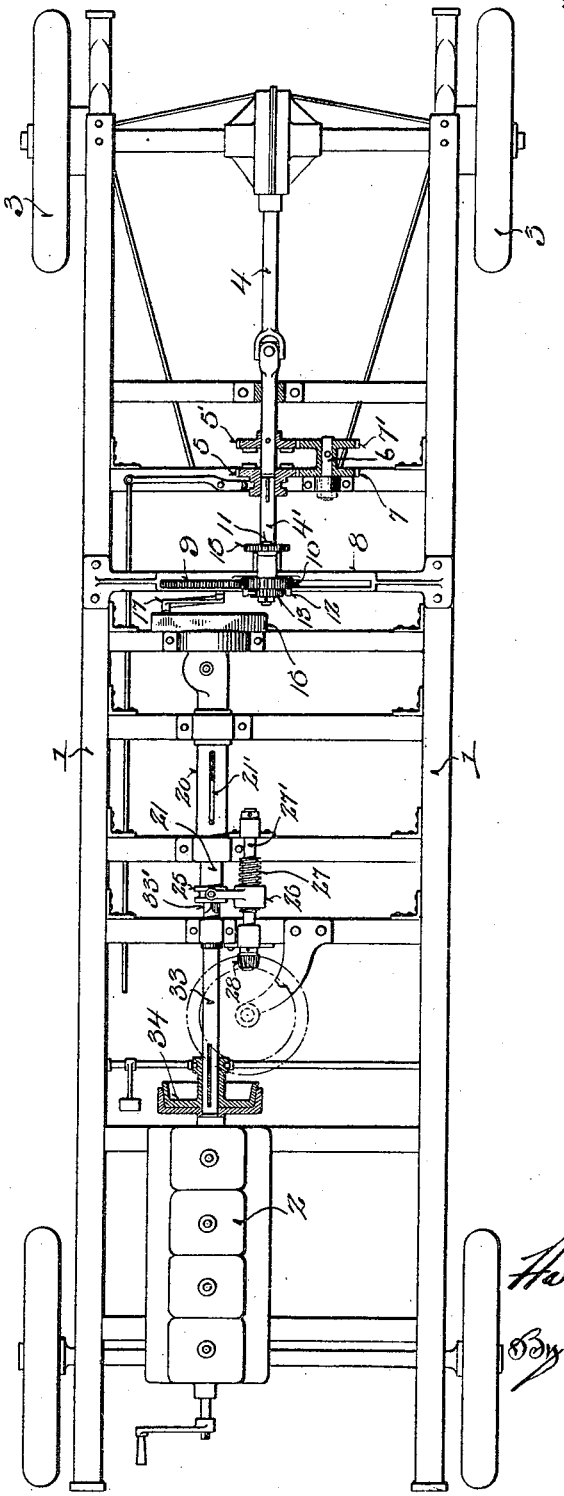

H. SULLIVAN.
ADJUSTABLE STROKE MECHANISM.
APPLICATION FILED MAR. 15, 1913.

1,128,544.

Patented Feb. 16, 1915.
2 SHEETS—SHEET 1.

H. SULLIVAN.
ADJUSTABLE STROKE MECHANISM.
APPLICATION FILED MAR. 15, 1913.
1,128,544.
Patented Feb. 16, 1915.
2 SHEETS—SHEET 2.
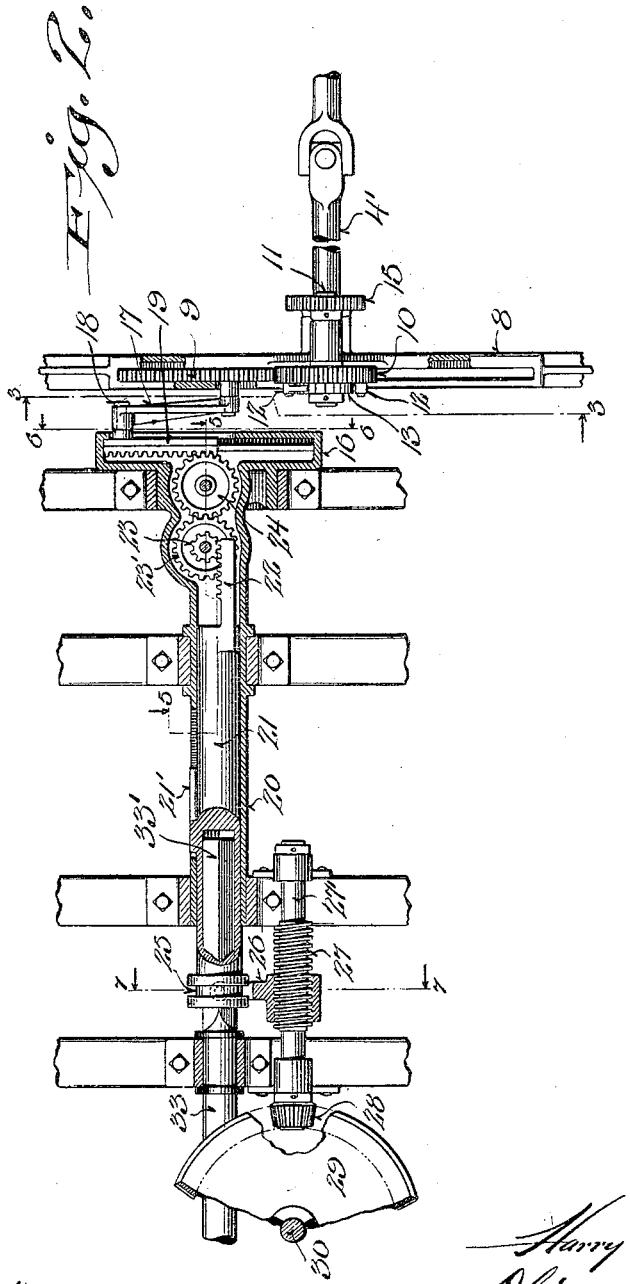

UNITED STATES PATENT OFFICE.

HARRY SULLIVAN, OF MILWAUKEE, WISCONSIN.

ADJUSTABLE-STROKE MECHANISM.

1,128,544. Specification of Letters Patent. Patented Feb. 16, 1915.

Application filed March 15, 1913. Serial No. 754,574.

*To all whom it may concern:*

Be it known that I, HARRY SULLIVAN, a subject of the Czar of Russia, and resident of Milwaukee, in the county of Milwaukee and State of Wisconsin, have invented certain new and useful Improvements in Adjustable-Stroke Mechanism; and I do hereby declare that the following is a full, clear, and exact description thereof.

The object of my invention is to provide a simple, effective and accurate transmission gearing under a unitary control whereby power from a motor can be converted in uninterrupted progression from zero to maximum speed without utilizing the ordinary shiftable gear connections generally employed, the ratio of speed between the prime mover and ultimate drive member being visibly displayed by a fixed indicator card that co-acts with a manually controlled lever mechanism for changing the speed of the drive.

My invention is particularly designed to be applied to self-propelled vehicles wherein it is desirable under certain conditions to come to a dead stop without killing the engine or to travel at very low, intermediate or maximum speed, which speed, if desired, may be accelerated over the speed of the motor or engine, the gearing being so arranged as to materially reduce friction and thus increase the power efficiency of said motor.

With the above and other objects in view the invention consists in certain peculiarities of construction and combination of parts as set forth hereinafter with reference to the accompanying drawings and subsequently claimed.

In the drawings Figure 1 represents a plan view of a self-propelled vehicle embodying the features of my invention, parts being broken away and in section to more clearly illustrate certain structural features, and Fig. 2, an enlarged detailed sectional plan view of the gear connection between the motor or drive shaft and the driven shaft of the vehicle.

Referring by characters to the drawings, 1 represents the frame of a standard truck provided with the usual motor 2 and rear drive wheels 3, motion being imparted to said drive wheels through a counter-shaft 4, which counter-shaft transmits power to the rear axle through the ordinary differential gearing, not shown. The counter-shaft 4 is constructed from two sections that are connected by a flexible coupling to permit vertical play of the rear wheels, the said shaft being also provided with a section 4', which section is arranged to be directly connected to the counter-shaft 4 by clutch-gears 5, 5', or indirectly connected through gear-wheels 7 and 7' that are carried by an idle shaft 6, as shown, whereby the drive is reversed, the reversal being effected through movement of a clutch-gear 5 through suitable lever connections to an engaging position with the gear-wheel 7, all of which structural features form no part of my invention.

A counter-shaft section 4' is suitably journaled in a hollow cross-girder 8 that forms part of the truck frame and constitutes a runway for a reciprocative double-faced rack-bar 9, which rack-bar meshes with upper and lower gear-wheels 10, 10', respectively. These gear-wheels are loosely mounted upon arbors 11, 11', that are journaled in suitable bearings with which the cross-girder is provided. The gear-wheels 10 and 10' carry sets of pawls 12 that extend in reversed directions and are arranged to engage corresponding reversed ratchet-wheels 13 and 13'. Hence when the rack-bar 9 is moved it will, through its gear connection, cause a partial positive rotation of the arbor 11' in the direction indicated. Upon a reverse stroke of the reciprocative rack-bar it is apparent that the power will be applied through its gear connections to the arbor 11. Thus it will be seen that the alternate movements of the rack-bar will impart rotation in the same direction to a gear-wheel 14 that is fast upon the counter-shaft section 4', which gear-wheel is alternately acted upon by corresponding gear-wheels 15, 15' that are secured to the arbors 11, 11', respectively.

Reciprocative motion is imparted to the rack-bar 9 through a revoluble crank-head 16 that is connected to said rack-bar by a pitman rod 17. The crank-head end of the pitman-rod is secured to a wrist-pin 18, which wrist-pin projects through a slot in said crank-head and is carried by an adjustable toothed bar 19, the same being slidably mounted in ways with which the aforesaid crank-head is provided. The toothed bar 19 is capable of being adjusted in or out with relation to the axis about which the crank-head revolves and hence with each complete rotation of said crank-head more or less rotatory motion is imparted to the drive-shaft 4, depending upon the adjusted position of the wrist-pin with respect to the axis of the crank-head. The crank-head is carried by a hollow shaft 20 which is suitably journaled in bearings that extend from cross-girders of the frame. Mounted in the hollow shaft 20 is a reciprocative rod 21, which rod is provided with a feather 21' that extends through a slot in said hollow head, whereby the rod is capable of endwise adjustment but is rotative with the shaft.

The forward end of the rod 21 carries a rack-bar 22, which rack-bar is adapted to mesh with a pinion 23 that is mounted upon a stud, which stud is journaled in the hollow crank-head. Revoluble with the pinion 23 and mounted upon its stud is a gear-wheel 23', which gear-wheel meshes with a corresponding gear-wheel 24 that is also journaled upon a stud that is carried by the crank-head. This gear-wheel 24, in turn, meshes with the toothed bar 19 and is adapted to move said bar in or out whereby the position of its wrist pin is adjusted with relation to its extreme working position and zero position that may be obtained by moving the aforesaid wrist-pin in axial alinement with the hollow shaft. The rear end of the reciprocative rod 21 is provided with an annular groove 25 for the reception of a spanner 26, the hub of which spanner is in threaded union with a worm 27 which is carried by a shaft 27' and is arranged parallel with the rod and hollow shaft and is suitably mounted in bearings that extend from cross-beams of the frame. One end of this worm-shaft carries a beveled pinion 28, which meshes with a beveled gear-wheel 29, which beveled gear-wheel is secured to a spindle 30 that is suitably journaled, its upper end being extended through a fixed indicator disk 31. The projecting end of the spindle 30 has secured thereto an actuating crank 32 that is provided with a pointer which is adapted to register with a scale that is provided on the face of the disk. Said scale may be arbitrarily arranged to indicate distances in any desired form.

Referring to Figs. 1 and 2 of the drawings, 33 indicates the motor-shaft which is provided with a squared end 33' that is in telescopic union with a correspondingly squared recess in the end of the reciprocative rod 21, the said motor-shaft being also provided with the usual clutch mechanism 34, whereby the motive power may be connected or disconnected as desired by suitable lever mechanism.

It is apparent from the foregoing description that should the motor shaft be revolved at maximum speed and the wrist-pin 18 be in its extreme outward position, as shown in Fig. 2 that maximum speed will be imparted to the vehicle. This is effected through the extreme reciprocative stroke of the wrist-pin, whereby the double-faced rack-bar 9 is thrown its greatest distance upon opposite sides of an imaginary line intersecting the axis of the arbors 11, 11'. Hence continuous motion at high speed will be imparted to the motor-shaft, whereby the vehicle will be driven at a speed that is determined by the number of revolutions of the engine or motor, the distance of travel being in proportion to the diameter of the traction wheels with relation to the number of revolutions of said motor or drive shaft. It is apparent that owing to the absence of multiple gear connections between the traction-wheels and motor that the direct drive thus obtained will provide the maximum of power and speed due to the fact that friction is reduced to a minimum. This maximum speed of the vehicle will be indicated by the position of the crank 32 with relation to the scale upon the disk so that the operator knows that when said crank or pointer is moved to indicate a certain number of miles per hour that this speed will be absolutely obtained.

When it is desired to reduce the speed or stop the vehicle while the engine is running, the pointer or crank 32 is moved to a position indicating the speed desired, or said pointer, to stop the vehicle, is brought to zero. In rotating the pointer for accomplishing the above results it is apparent that the worm 27 through its gear connection is rotated, whereby the rod 21 is caused to move endwise and thus through its gear connection with the toothed bar 19 draw the wrist-pin 18 inward to an intermediate position with relation to the axis of the crank-head or in direct alinement with said axis. In the intermediate position assumed by the wrist-pin it is apparent that the stroke imparted to the reciprocative rack-bar will be shortened and thus with each complete revolution of the crank-head a proportionate reduction in the rotation of the counter-shaft will result. It is apparent that when the rod 21 is moved in or out to shift the position of the wrist-pin that said rod is locked in its shifted position together with the wrist-pin due to the fact that the spanner 26 is moved in or out through a worm-gear connection.

From the foregoing description it should also be understood that while I have described various specific mechanical details for carrying out my invention that the same may be varied in accordance with the knowledge of skilled mechanics for accomplishing the desired result.

I claim:

A transmission gearing comprising a hollow driven shaft, a hollow crank-head carried thereby, a rack-bar in slidable union with the crank-head, a crank-pin carried by said rack-bar, a train of toothed gears mounted in the crank-head, one of which is in mesh with the rack-bar, a reciprocative rod mounted in the hollow shaft and in spline connection therewith, the rod being provided with a socket recess at its outer end, a rack extending from the inner end of the rod in mesh with one of the crank-head gears, a shaft in driving telescopic union with the rod recess, means for holding said shaft against endwise movement, and means for shifting the rod longitudinally upon the driven shaft.

In testimony that I claim the foregoing I have hereunto set my hand at Milwaukee in the county of Milwaukee and State of Wisconsin in the presence of two witnesses.

HARRY SULLIVAN.

Witnesses:
N. E. OLIPHANT,
M. E. DOWNEY.

Copies of this patent may be obtained for five cents each, by addressing the "Commissioner of Patents, Washington, D. C."